United States Patent [19]
Bortolini

[11] Patent Number: 5,909,906
[45] Date of Patent: Jun. 8, 1999

[54] GLASS PLATE AUTOMATIC DRILLING AND MILLING MACHINE

[75] Inventor: Francesco Bortolini, Miane, Italy

[73] Assignee: Intermac S.R.L., Pesaro, Italy

[21] Appl. No.: 08/817,732

[22] PCT Filed: Sep. 13, 1996

[86] PCT No.: PCT/EP96/04060

§ 371 Date: Apr. 24, 1997

§ 102(e) Date: Apr. 24, 1997

[87] PCT Pub. No.: WO97/10914

PCT Pub. Date: Mar. 27, 1997

[30] Foreign Application Priority Data

Sep. 19, 1995 [IT] Italy .................................. TV95A0109

[51] Int. Cl.[6] .................................................. B23B 39/00
[52] U.S. Cl. .............................. 29/26 A; 29/563; 408/39; 408/40; 451/195
[58] Field of Search .................................. 408/37, 39, 40, 408/41; 125/20; 451/41, 195, 262; 29/26 A, 50, 563

[56] References Cited

U.S. PATENT DOCUMENTS

| | | | |
|---|---|---|---|
| 2,890,730 | 6/1959 | Gottlieb | 408/39 |
| 3,723,083 | 3/1973 | Ritter, Jr. et al. | 65/119 |
| 3,813,820 | 6/1974 | Highberg et al. | 51/81 |
| 3,828,479 | 8/1974 | Highberg et al. | 451/195 |
| 3,977,804 | 8/1976 | Kitagawa | 408/39 |
| 4,179,230 | 12/1979 | Kitagawa | 408/39 |
| 4,579,483 | 4/1986 | Padovani | 408/39 |
| 4,691,684 | 9/1987 | Negron-Crespo | 29/563 |
| 5,005,318 | 4/1991 | Shafir | 451/41 |
| 5,028,176 | 7/1991 | Delventhal et al. | 408/40 |
| 5,152,641 | 10/1992 | Overmyer et al. | 408/1 R |
| 5,325,635 | 7/1994 | Ikola et al. | 451/5 |
| 5,639,289 | 6/1997 | Fluckiger | 65/166 |
| 5,713,784 | 2/1998 | Miller | 451/65 |

*Primary Examiner*—Andrea L. Pitts
*Assistant Examiner*—Christopher Kirkman
*Attorney, Agent, or Firm*—Bucknam and Archer

[57] ABSTRACT

A glass plate automatic drilling and milling machine, adapted to provide for holes and/or openings having different size, configuration and positioning, comprises a support structure provided with rotating rollers (23, 24) for the sliding of the plates disposed on vertical or slightly inclined direction thereon, as well as comprising a grasping pliers (25) for grasping each plate and transferring it toward a drilling and milling unit (13) with fixed installation, which in turn is provided with two carriages (15, 16) identical and opposite symmetrically to each other. Each carriage is provided with spindles (29, 30, 31, 32) for supporting drills and milling cutters having different size, of which the spindles of each carriage operate alternatively in opposition to each other. At the end of machinings, the plates in case are passed through a glass-cleaning machine (20) for being cleaned and subsequently packed.

8 Claims, 4 Drawing Sheets

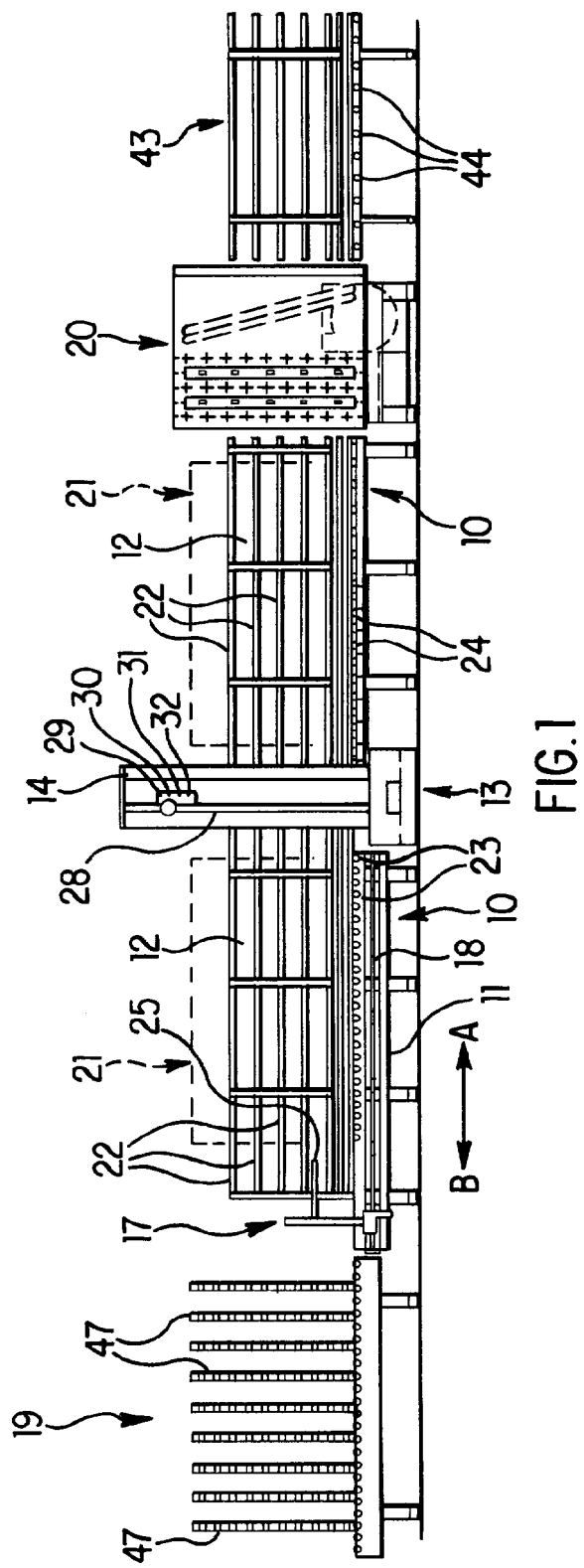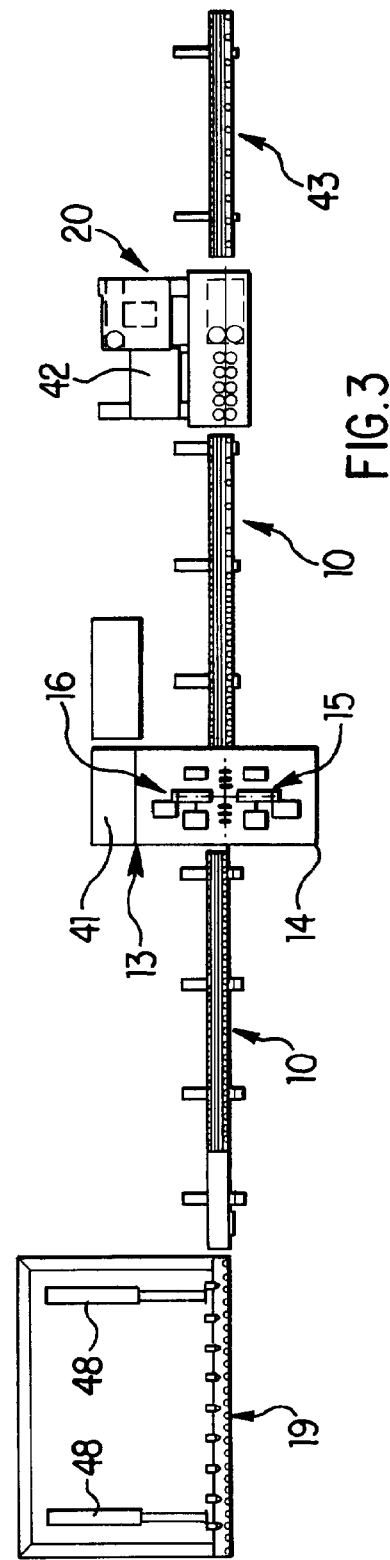

GLASS PLATE AUTOMATIC DRILLING AND MILLING MACHINE

FIELD OF THE INVENTION

The invention relates to an automatic operating machine and in particular for drilling and milling glass plates having different shapes and sizes.

BACKGROUND OF THE PRIOR ART

Machines for automatic drilling glass plates having different shapes and sizes are known, and comprise substantially a plurality of horizontal rotating rollers mounted on a support structure and provided for supporting slidably the different glass plates to be drilled at established positions thereof, in which structure one or more drilling units are also mounted, which are formed by a set of aligned drills operated by a numerical control system provided with computer and which can be set through a proper software program, so as to regulate in advance the position and size of the holes to be made on the respective glass plates.

However, these drilling machines have the drawbacks that they are made with considerable overall dimensions because of the extent in a horizontal direction thereof and being able to perform only automatic drilling operations on the glass plates and being not able to perform possible automatic machinings of any other type such as for example the forming of through or blind cavities having different shapes and sizes and at different positions on the glass plates, since in these cases the machinings referred to must be performed necessarily with special manual operations, with consequent lower productivity and possibility to damage the glass plates on which such additional machining operations are performed.

SUMMARY OF THE INVENTION

The present invention has the object to eliminate the above mentioned drawbacks, by means of an automatic operating machine and in particular for drilling and milling glass plates having different shapes and sizes, which is made in a manner to permit not only to drill but also to perform machinings of other kind such as for example to perform openings having different shapes and sizes on the glass plates, wherein such machine is set for machining the plates by arranging them at a vertical or sligthly inclined direction, in a way to obtain a high operative capacity with compact and reduced overall dimensions of the same machine.

BRIEF DESCRIPTION OF THE DRAWINGS

The characteristics and advantages obtained with the machine in accordance to the invention will be evident from the following description, by way of a not limitative example only and with reference to the accompanying drawings, wherein:

FIG. 1 shows a schematic front view of the drilling and milling machine according to the invention;

FIG. 3 shows a schematic plan view of the machine of FIG. 1;

In the Figures referred to, it is represented schematically a machine adapted to perform the automatic drilling and milling of glass plates having different shapes and sizes, and in particular for providing holes or openings onto them having different size, configuration and positioning.

Figure 2:
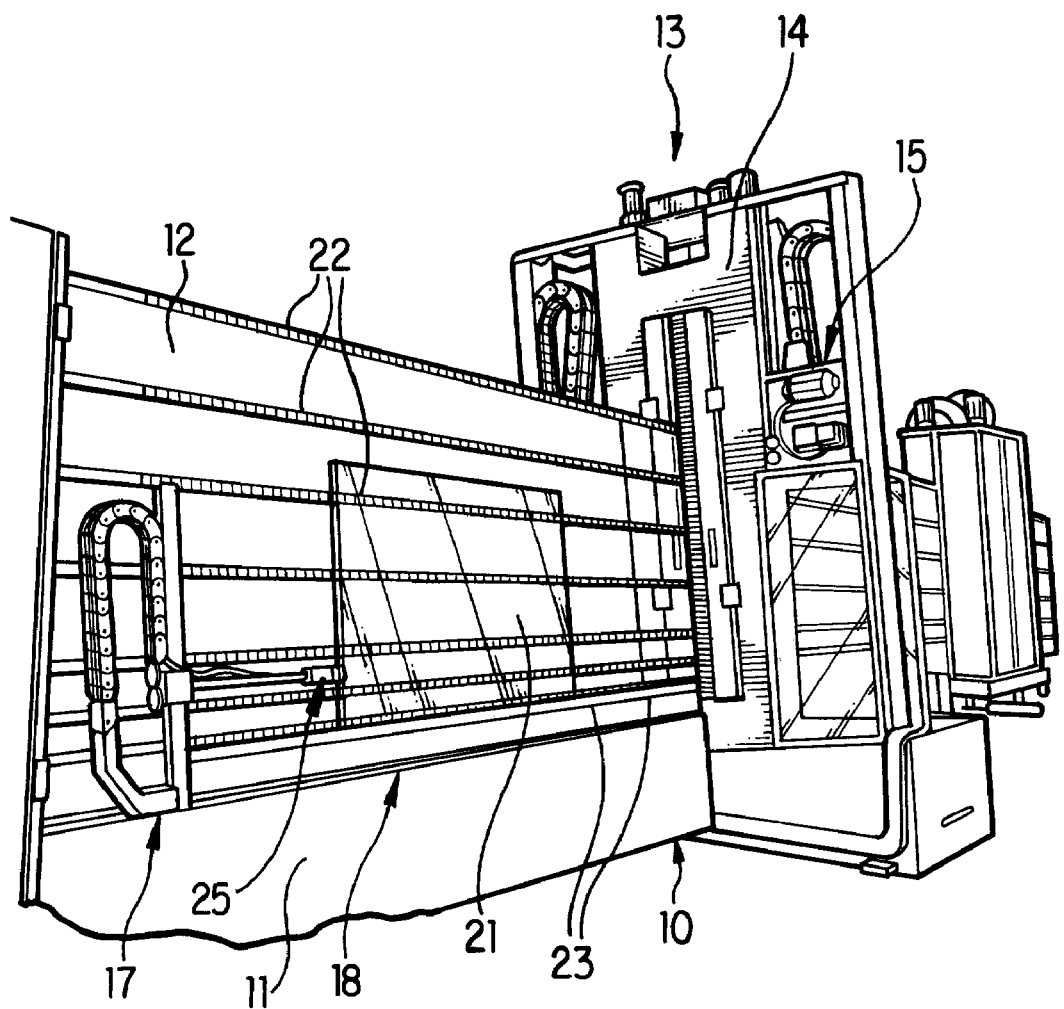
FIG. 2 shows a perspective front view of the machine of FIG. 1.

By referring particularly to the FIGS. 1–3, it is noted that the machine referred to is constituted substantially by a lengthened rectilinear support structure 10, formed by a horizontal extended base 11 joined to an orthogonal rest surface 12 having vertical or sligtly inclined extent, and at least one fixedly secured drilling and milling unit 13 formed by a single support structure 14 onto which at least two carriages 15 and 16 identical and opposite symmetrically from each other are mounted, which carriages are slidable reciprocatingly along correspondent vertical guide members (not shown) provided on the support structure 14 and arranged in correspondence of the opposite rectilinear surfaces of the rest surface 12 as well as provided with suitable tools for performing the various machinings required on the glass plates in the manner hereinafter described.

Besides, the present machine is constituted by at least another carriage 17, positioned on the machine initial portion and slidable reciprocatingly, in the sliding directions A and B opposite from each other, on rectilinear guide members 18 provided on the upper side of the extended base 11, and extended between the machine initial portion, in which the loading of the glass plates in the manners which will be described later is carried out, and the drilling and milling unit 13.

Finally, the machine according to the invention may be constituted advantageously but not necessarily also by a tipping unit 19 and a glass-cleaning machine 20, situated respectively on the initial portion and end portion of the same machine and provided and made in the manner and for the purposes hereinafter described.

In particular, the base 11 and the rest surface 12 serve to support a plurality of glass plates 21 to be drilled and milled, which are loaded and disposed on the machine at a vertical or slightly inclined position thereof, by laying them with one of their surfaces against a plurality of rest rolls 22 made of suitable soft material, secured to the front surface of the same rest surface for the entire extent of the first and second base portion and rest surface respectively comprised between the machine initial portion and the drilling and milling unit 13 as well as between this latter and the end portion of the same machine.

Moreover, the base 11 is provided at its upper side with a plurality of idle rotating rollers 23, situated on the first base portion, and a plurality of powered rotating rollers 24 situated on the second base portion and adjustable in height, in order to permit each glass plate loaded on the machine to slide from the initial portion thereof toward the drilling and milling unit 13 and from this latter toward the end portion of the same machine.

In turn, the carriage 17 is provided for determining the positioning and displacement of each glass plate loaded on the machine from the initial portion thereof toward the drilling and milling unit 13.

For this purpose, such carriage 17 is provided with a suitable glass plate grasping tool constituted preferably by at least a grasping pliers 25 with a rectilinear reciprocating sliding, which is slidable along the rectilinear guide members 18 on one and the other of both the sliding directions A and B thereof, and which is driven by a screw with ball rotation having horizontal rectilinear extent (not shown), whose movements are controlled by a proper machine electronic control system, depending on each operating program which has been set in advance by means of a special computer, included in the mentioned control system and associated to a video displaying the data of the selected programs, said pliers being controlled in such a manner as to be displaced from an open position thereof wherein the vertical initial edge of each glass plate loaded in advance on the machine and displaced in correspondence of the same pliers may be inserted between the spread apart legs thereof, to a closing position thereof wherein such legs are tightened against the glass plate so as to be able to displace it progressively toward the drilling and milling unit 13, by letting it slide on the idle rollers 23.

Figure 4:
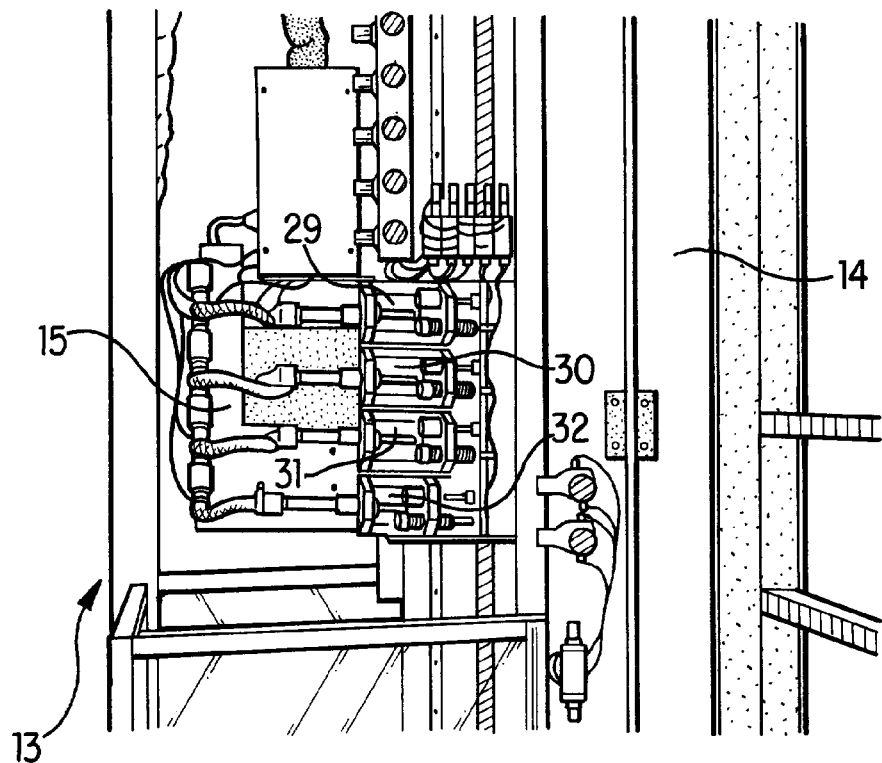
FIG. 4 shows a partial side view of a constructive item of the machine according to the invention.

Such grasping pliers 25 may be also displaced vertically with a manual operation at different height along the rest surface 12, thereby adapting it to the sizes of the glass plates respectively loaded on the machine Furthermore, the carriages 15 and 16 of the drilling and milling unit 13 (see also FIG. 4) are each constituted by a set of spindles with horizontal axis, which are overlapped and aligned vertically to each other, such spindles being controlled by the machine electronic control system, depending on each operating program to be performed set in advance, to be displaced selectively on a horizontal direction thereby to be able to be approached to or moved away from the glass plate respectively positioned in correspondence of the drilling and milling unit 13, and on a vertical direction by means of vertical reciprocating sliding of each carriage along the corresponding vertical guide members of the support structure 14, being operated by means of a vertical screw 28 with ball rotation driven by suitable driving means of the machine (not shown), or also by other per se known suitable driving means so as to be able to change the height position thereof with respect to the associated glass plates to be machined. Besides, the spindles of one carriage are positioned in correspondence of those one of the glass plate main surfaces, and are perfectly opposite and spaced with respect to the corresponding spindles of the other carriage, which in turn are positioned in correspondence of the other main surface of the same plates. By way of a not limiting example only, from the FIGS. 1 and 4 it is noted that each carriage is constituted preferably by a set of four spindles wherein the spindles 29, 30, 31 and 32 mounted on the fore carriage 15 are made evident, but of course the number of spindles may be changed at will depending on the machinings to be performed on the glass plates, thus without departing from the scope of protection of the invention. In the case referred to, then, the spindles 29, 30 and 31 perform the drilling function and to this aim they are provided with conventional cylindrical drills (not indicated in the Figure), turned toward the correspondent main surface of the glass plate here positioned, so as to perform corresponding through or blind holes on the same plate, while the remaining spindle 32 performs the milling function and to this aim it is provided with a conventional milling cutter (not indicated too in the Figures), turned toward the same glass plate main surface. Likewise, also the spindles mounted on the back carriage 16 are arranged with the same succession and for the same function of the respectively opposite spindles of the preceding carriage 15, so that the drills and the milling cutter mounted thereon are turned toward the other glass plate main surface. This arrangement of the drills and the milling cutters on the spindles permits to perform holes having the same diameter and also different diameters, and milling operations with different configurations on one and the other one surface of the glass plates. In the example referred to, the machine is able to perform preferably holes having diameters up to 60–80 mm, by utilizing the classic drills, and holes having greater diameters by utilizing corresponding milling cutters.

In particular, the drilling and milling operations through the glass plates which are moved selectively and in advance by the grasping pliers 25 in correspondence of the drilling and milling unit 13, whose carriages 15 and 16 are also driven by the machine control system in a manner that the associated spindles are moved into the correct positions to be drilled and milled of the plate, are performed by actuating firstly the associated spindles situated on the one carriage, for example the fore carriage 15, so as to move such spindles separately or contemporaneously toward the relative area of the correspondent glass plate surface, and to enter it for a certain depth, and subsequently by retracting such spindles and actuating the spindles situated on the other carriage, in the example referred to the back carriage 16, so as to move such spindles separately or contemporaneously toward the same area of the correspondent glass plate surface, which is opposite to the preceding surface, and to enter the same surface for the remaining depth of said plate, at positions coinciding with those of the holes and milling operations performed by the previous spindles, and finally by retracting such spindles, thereby obtaining the desired through holes and millings without the risk of damages (chippings, etc.) of the glass plates.

At the end of the machinings of the two surfaces of the plates; these are advanced again and the carriages are actuated in a manner to move the spindles exactly on the new drilling and milling positions of the glass plates, so that these latter may be machined again with the same operative sequences as described previously.

It is pointed out that obviously also the movements of the spindles are controlled by the machine electronic control system, in association with the glass plate feeding through the drilling and milling unit 13, and in particular the feedings of the spindles and the relative drills are controlled in such a way as to change the speeds of penetration of the drills onto the glass plates, by adapting them from time to time to the respective diameters of the same drills and therefore the diameters of the holes to be performed.

With these criteria, it is also possible to adjust the drill penetration depth on the glass plates during the drilling operations, depending on their thickness of and the wear rate and therefore the machining capability of the same drills. In this way, it is possible to perform holes and millings of different sizes and kinds, in which such holes may be through, blind and flared holes, while the millings may be utilized for providing holes (having diameters greater than those which can be performed with the drills), and openings having various sizes and shapes.

Figure 6:
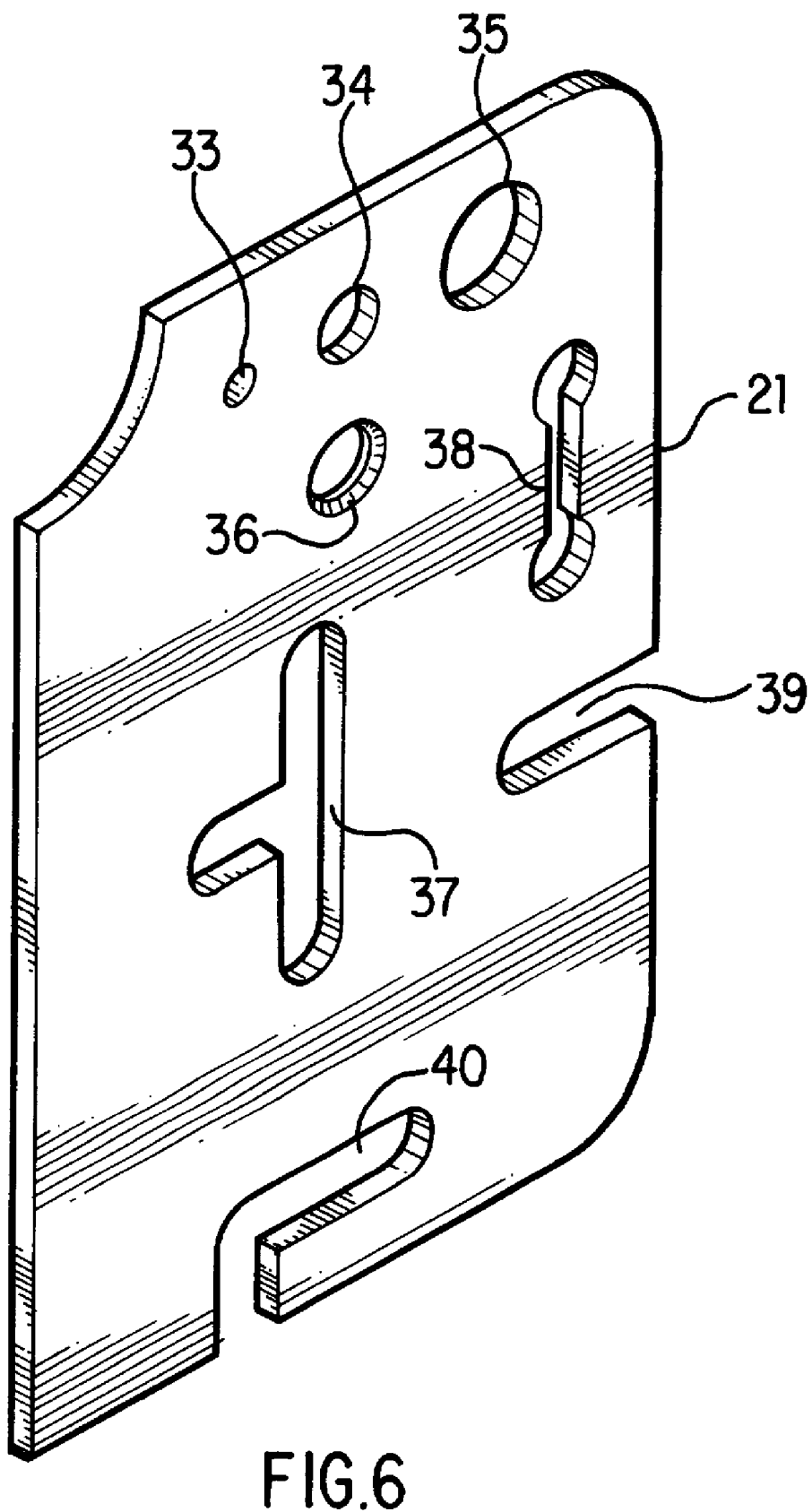
FIG. 6 shows a glass plate with some machining operations which can be performed onto it by means of the present machine.

In FIG. 6 there are shown some types of holes and openings which can be performed on a glass plate 21, and to this purpose there are noted some cylindrical holes 33, 34 and 35 having different diameters, a flared hole 36 and through openings 37, 38, 39 and 40 having different shapes, which are normally obtained by means of drillings and millings suitably combined to each other.

By way of example only, in the case in which one or more flared holes or openings must be performed on the glass plate, it is opportune to prearrange the foreseen drills or milling cutters and the specific flaring milling cutters on the carriage spindles, and to effect firstly the drilling or milling operations and thereafter the flaring ones, by actuating the different spindles with the established sequences. In this way, it is possible to perform the above mentioned machinings with the machine referred to by mounting with different and variable combinations the machining tools on the associated spindles, and setting adequately the different machining programs on the informatic control system of the same machine, in order to rationalize the operative sequences thereof by adapting them to the respectively needed machining kinds and to obtain operative performances at high efficiencies and reliability.

By way of example only, on the spindles of a carriage there are mounted two drills and on the opposite spindles of the other carriage there are mounted respectively a drill and a milling cutter.

The so made machine is also associated advantageously with one or more containers 41 having suitable form and size, disposed in correspondence of the drilling and milling unit 13, beneath thereof, for the collection of the scraps deriving from the glass machining.

In this manner, the machine according to the invention permits to machine automatically the glass plates prepared in advance and loaded on the same machine, not only with drilling operations but also with milling operations, simply by setting in advance in the control system the respectively selected machining programs, and by manipulating the machine only for operating and stopping it, by acting preferably onto a proper pedal-controlled switch (not indicated in the Figures).

Besides, this machine, thanks to its extent in a horizontal direction, with the same productive capacity may be made with reduced and compact overall dimensions and therefore can be installed onto narrower spaces with respect to those ones required by the drilling machines which are in commerce at the present.

Finally, the present machine is able to transport the machined glass plates toward the end portion thereof, by arranging them onto the powered rotating rollers 24 disposed on the second base portion 11 and the rest surface 12, such glass plates being subsequently unloaded from the machine and packed and delivered.

The machine can be also provided with a glass-cleaning machine 20, already mentioned previously, and provided with suitable cleaning tools (spraying nozzles, brushes, et..) incorporated on a system for circulating and collecting the water or other adequate cleaning liquid, which are activated automatically in the presence of the glass plates to be cleaned for a period of time enough to determine an effective cleaning of the same plates.

Figure 5:
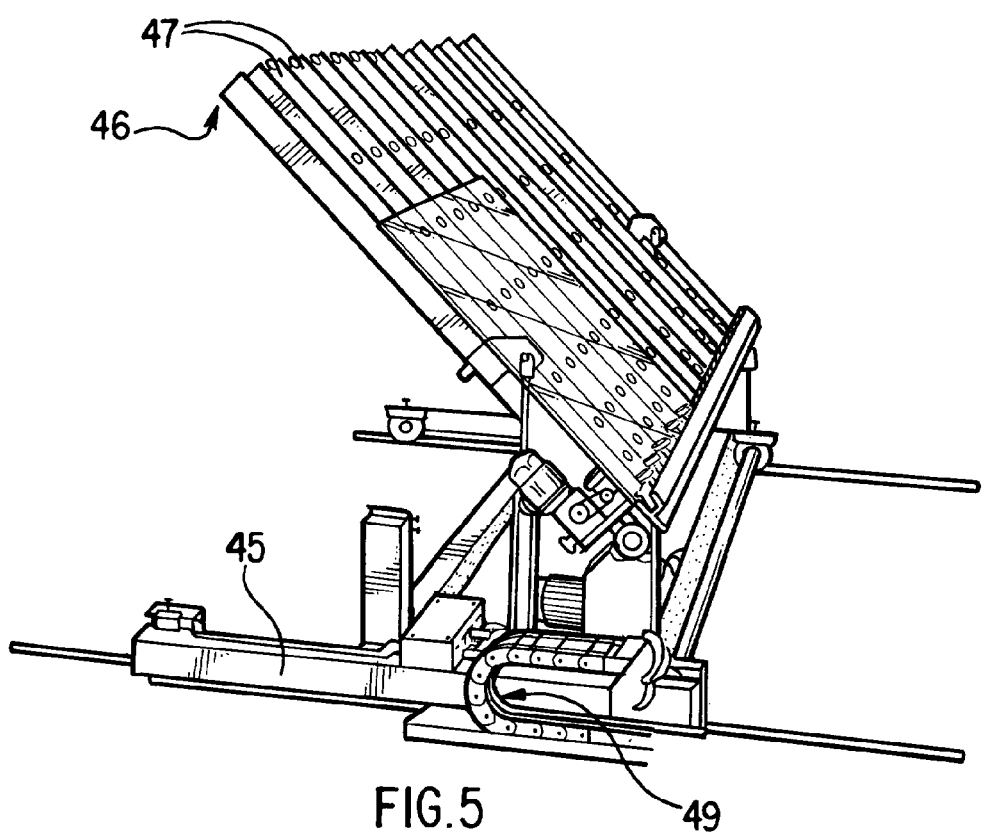
FIG. 5 shows a perspective side view of another constructive item of the machine according to the invention.

In such case, the glass-cleaning machine 20 is made in such size as to be adapted to the unloading area of the present drilling and milling machine, and to be switched on and controlled by the relative informatic electronic control system, thereby synchronizing the operative sequences of both machines, and it is associated also to one or more containers 42 for the collection of the discharged cleaning liquid, and to an additional base and rest surface, marked with the reference numeral 43, which is arranged downward the glass-cleaning machine and is provided with rotating rollers 44 for conveying slidably the cleaned glass plates toward the subsequent packing and delivery station of the same plates. Finally, in FIG. 5 it is now described synthetically the tipping unit 19 which can be provided in association with the machine according to the invention, and installed upstream thereof, in correspondence of its initial portion, in order to receive the glass plates coming from preceding machinings and positioned in a horizontal direction, and to tip them in a vertical direction so as to be able to load them on the present machine, for performing the above specified machinings on the same plates.

Such tipping unit 19 substantially comprises a rigid support structure 45, adapted to be arranged upstream the drilling and milling machine, near its initial loading portion, in which a rectilinear rest surface 46 is mounted in an articulated manner, which is formed by a plurality of metallic rods 47 arranged parallel to each other and welded together, and is also provided with a set of hydraulic oil, pneumatic operated cylinders or the like, marked with the reference numeral 48, joined to the rest surface 46 and a control system 49 of hydraulic oil, pneumatic or the like type, the actuation of which causes therefore the contemporaneous displacement of the cylinders 48, thereby providing for the displacement of such rest surface from a first not tipped horizontal position thereof, in which the various horizontal glass plates to be loaded on the present machine can be laid onto the upper side of the same surface, to a position thereof tipped vertically or inclined in a different manner, which adapts itself to the position of the machine rest surface 12, so that the glass plates may be transferred onto this latter surface and submitted to the machinings mentioned as above. Moreover, the tipping unit 19 may be made also in the version of tipping-traveling unit (not shown), in which it is substantially identical to the just described unit and with respect thereto it is provided with suitable per se known handling mechanisms, adapted to determine automatically the displacement at different positions thereof.

This tipping-traveling unit may be advantageously used under certain conditions, for example in the case in which the drilling and milling machine is not with the glass-cleaning machine 20 of the type referred to, which is shaped in a manner to support and clean the glass plates disposed in a vertical or slightly inclined position, and it is needed that the already machined glass plates be transferred toward another glass-cleaning machine (not shown), separate from the present drilling and milling machine and prearranged for supporting and cleaning the same plates arranged on a horizontal direction.

Then, under these circumstances such tipping-traveling unit is displaced from the position upstream to the position downstream the machine, by arranging itself in correspondence of the end portion of the same machine, so that it provides for receiving and tipping on a horizontal direction all the glass plates leaving said machine, by transferring them thereafter toward the additional glass-cleaning machine for cleaning them, and then by displacing it again in correspondence of such initial portion and tipping it in a vertical direction again, in order to repeat the same described operative sequences. Finally, in the machine according to the invention the grasping pliers 25 are advantageously made of a retractable type, so as the glass plates coming from preceding machinings of other kind, which are already arranged on a vertical direction, can be loaded without impediments onto the initial portion of the present machine, by displacing firstly such grasping pliers so as to release the glass plate passageway, and then by returning said pliers back to its operating position, for hooking said glass plates and transporting them through the machine.

I claim:

1. A machine for automatically drilling and milling glass plates comprising a loading and an unloading area, a support structure (10) provided with a plurality of rotating rollers (23,24) for supporting the glass plates and transporting the glass plates from said loading area to said unloading area, by passing through drilling means controlled by control means, said drilling means controlled by control means being capable of setting and controlling the drilling of openings of different shape and size, the machine further comprising tipping means (19) and cleaning means (20) for the glass plates, said tipping means receiving the glass plates positioned in a horizontal direction and tipping them on a vertical direction so as to arrange them on the drilling and milling machine, said cleaning means cleaning said glass plates at the end of the drilling of openings of different shape and size wherein said support structure (10) is shaped in a manner to house and transport the glass plates arranged on a vertical or slightly inclined position, the machine also comprising grasping means (25) for clasping said glass plates (21) loaded on the machine and arranged by said tipping means onto the drilling and milling machine, and transporting them through said drilling means (29, 30, 31) and means (32) for milling the openings onto said glass plates, said milling means (32) interacting with said drilling means.

2. The machine according to claim 1 wherein said support structure (10) is made with a lengthened rectilinear shape, formed by a horizontal attended base provided at its upper side with said rotating rollers (23, 24) and joined to an orthogonal rest surface (12) having vertical or slightly inclined extent, provided with a plurality of rest rolls made of suitable soft material, for laying said glass plates (21) thereon.

3. The machine according to claim 2 wherein said machine has an initial portion and wherein said grasping means comprise at least one set of grasping pliers (25), said pliers being arranged on said initial portion and being actuated with a reciprocating rectilinear sliding on the horizontal as well as vertical direction thereof by a driving mechanism and being displaceable from an opened position thereof for inserting each glass plate therein to a closed position thereof for tightening said glass plates (21).

4. The machine according to claim 2 which has a loading initial portion and an unloading end portion, wherein said drilling means (29, 30, 31) are provided, together with said milling means (32), an respective carriages (15, 16), said carriages being mounted opposite symmetrically to each other and slidable reciprocatingly and vertically on a single support structure (14), forming a drilling and milling unit (13) with fixed installation disposed between said loading initial portion and said unloading end portion of the machine, and being disposed between said grasping means and said cleaning means, said rest surface (12) having opposite rectilinear surfaces, whereby said milling and drilling units are positioned in correspondence of said opposite rectilinear surfaces of said rest surface (12), said drilling means being constituted by a first and a second set of spindles (29, 30, 31) provided with conventional drills and supported respectively by said carriages (15, 16), the spindles of the first set being arranged respectively opposite to and spaced from the spindles of the second set, said spindles being drivable in rotation and being movable from a rest position to an operating position thereof, in which the associated drills are respectively spaced from or in contact with said glass plates (21), in such a manner that when the spindles of a set are driven in the operating position the spindles of the other set are stopped in the rest position.

5. The machine according to claim 4 which comprises a milling cutter and wherein said drills and said milling cutter may be mounted on the respective spindles with different and variable combinations thereof.

6. The machine according to claim 4 wherein said milling means are constituted by a first and a second set of at least a spindle (32) provided with a milling cutter of conventional type and supported respectively by said carriages (15, 16), together with said spindles (29, 30, 31) provided with drills, wherein the spindle of the first set is arranged opposite to and spaced from the spindle of the second set, said spindle being drivable in rotation when said spindles (29, 30, 31) provided with drills are stopped and being displaceable from a rest position to an operating position thereof, in which the associated milling cutter is respectively spaced from or in contact with said glass plates (21), in such a way that when the spindle of a set is driven in the operating position, the spindle of the other set is stopped in the rest position.

7. The machine according to claim 4 wherein said tipping means (19) comprise a rigid support structure (45) arranged upstream and also downstream of the machine, and in which a rectilinear rest surface (46) is articulated, said rest surface being formed by a plurality of metallic rods (47) arranged parallel to each other and fixed together, said rest surface (46) being joined to a set of control cylinders (48) connected on a control system (49) and controlled contemporaneously in such a manner as to provide for the displacement of the rest surface from a not tipped horizontal position thereof, for loading the glass plates thereon, to a vertical or slightly inclined tipped position thereof, which adapts itself to the position of said rest surface (12) of the machine, in order to transfer said glass plates on said loading initial portion or from said unloading end portion.

8. The machine according to claim 1 which includes a packing station, and wherein said glass plate cleaning means comprise a glass-cleaning machine (20) provided with cleaning tools, said cleaning tools including a source of water, spraying nozzles, brushes, said cleaning tools being incorporated on a system for circulating and collecting the water or other suitable cleaning liquid, said cleaning tools being activated in the presence of the glass plates for a period of time enough to clean said glass plates, said glass-cleaning machine (20) being arranged downstream of the drilling and milling machine and further comprising an additional base and rest surface (43) arranged downstream thereof and provided with rotating rollers (44) for transporting the glass plates toward a packing station thereof.

* * * * *